United States Patent
Kim

(10) Patent No.: US 7,602,377 B2
(45) Date of Patent: Oct. 13, 2009

(54) MOBILE DEVICE AND METHOD FOR PREVENTING UNDESIRED KEY DEPRESSION IN THE SAME

(75) Inventor: Chan-Woo Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 251 days.

(21) Appl. No.: 10/983,707

(22) Filed: Nov. 9, 2004

(65) Prior Publication Data

US 2005/0107126 A1     May 19, 2005

(30) Foreign Application Priority Data

Nov. 18, 2003    (KR)  ......................  10-2003-0081627

(51) Int. Cl.
     *H04M 1/00*      (2006.01)
(52) U.S. Cl. ................. 345/169; 455/575.1; 455/575.4; 455/565
(58) Field of Classification Search ................. 455/565, 455/511, 575.3, 575.4; 345/169
See application file for complete search history.

(56) References Cited

U.S. PATENT DOCUMENTS

| | | | |
|---|---|---|---|
| 4,945,556 A * | 7/1990 | Namekawa ................. | 455/565 |
| 5,241,583 A * | 8/1993 | Martensson ................. | 455/565 |
| 5,805,084 A | 9/1998 | Männistö | |
| 5,864,765 A * | 1/1999 | Barvesten ................... | 455/565 |
| 6,370,362 B1 * | 4/2002 | Hansen et al. ............. | 455/90.1 |
| 6,370,400 B1 * | 4/2002 | Decotignie et al. .......... | 455/565 |
| 6,449,492 B1 * | 9/2002 | Kenagy et al. ........... | 455/550.1 |
| 6,874,094 B2 * | 3/2005 | Parker ........................ | 713/310 |
| 6,892,081 B1 * | 5/2005 | Elomaa ................... | 455/575.1 |
| 2001/0012790 A1 * | 8/2001 | Park et al. ................... | 455/565 |
| 2004/0063423 A1 * | 4/2004 | Kagay, Jr. ................... | 455/410 |
| 2004/0116167 A1 * | 6/2004 | Okuzako et al. ......... | 455/575.3 |
| 2004/0203604 A1 * | 10/2004 | Pugliese ..................... | 455/411 |
| 2005/0116840 A1 * | 6/2005 | Simelius ..................... | 341/22 |
| 2005/0221873 A1 * | 10/2005 | Kameyama et al. ...... | 455/575.4 |
| 2006/0030367 A1 * | 2/2006 | Cowsky et al. ............. | 455/565 |
| 2006/0205432 A1 * | 9/2006 | Hawkins et al. .......... | 455/552.1 |

FOREIGN PATENT DOCUMENTS

| | | |
|---|---|---|
| CN | 1170328 | 1/1998 |
| DE | 102 35 546 | 10/2003 |
| EP | 1263199 | 12/2002 |
| JP | 2003-058302 | 2/2003 |
| KR | 1998085647 | 12/1998 |
| KR | 20020031572 | 5/2002 |
| WO | WO 03/075585 A1 | 9/2003 |

OTHER PUBLICATIONS

Chinese Search Report dated Nov. 2, 2007 (with English-language translation).

* cited by examiner

*Primary Examiner*—Patrick N. Edouard
*Assistant Examiner*—Julio R Perez
(74) *Attorney, Agent, or Firm*—KED & Associates, LLP

(57) ABSTRACT

Undesired key depression of a mobile device is prevented using a predetermined key activation pattern. This pattern includes successively pressing one or more keys of the mobile device a predetermined number of times. When this occurs, the mobile device converts from a key depression preventing mode to a half-operation mode. During this latter mode, functions corresponding to key inputs are automatically performed, provided they are input within a prescribed period of time. Otherwise, the mobile device converts back to the key depression preventing mode. As a result, undesired operation and power consumption of the mobile device is prevented.

41 Claims, 4 Drawing Sheets

MOBILE DEVICE AND METHOD FOR PREVENTING UNDESIRED KEY DEPRESSION IN THE SAME

BACKGROUND OF THE INVENTION

1. Field of the Invention

The present invention generally relates to electronic devices, and more particularly to preventing undesired external key depression of a mobile device.

2. Description of the Related Art

Mobile devices such as mobile phones, smart phones, CD players, cassette players, MP-3 players, personal digital assistants (PDAs) and the like are now in widespread use. In fact, many people always carry two or more of these for personal and/or business use.

FIG. 1 is a view showing external keys of mobile devices for performing various operations. In order to prevent undesired key depression in carrying the mobile device, a locking key having a hold function may be attached thereto by hardware. Or, in case of a slide-type mobile phone which has been recently commercialized, a locking state is released only when a specific key is pressed for prescribed time, and then a key input for performing an operation is received.

In a mobile device which uses a locking key, if a user mistakenly fails to activate the locking key external operation keys may be inadvertently pressed and thus the battery may be completely consumed. In addition, releasing and re-activating a locking key repeatedly whenever a mobile device is used is an annoyance to the user.

To prevent undesired external key depression in a related-art device, a key may be pressed for a prescribed time. However, when a user carries the device in his or her pocket or bag, the key maybe inadvertently pressed for a time longer than the prescribed time in many cases. For this reason, the related-art method is not good for preventing undesired external key depression.

SUMMARY OF THE INVENTION

An object of the present invention is to solve one or more problems of the related-art and/or to achieve at least one of the following advantages.

Another object of the present invention is to provide a method for preventing undesired key depression which prevents undesired external key depression of a mobile device using a double-click technique.

To achieve these and other objects and advantages, the present invention provides in accordance with one embodiment a method for preventing undesired key depression including a depression preventing mode in which an operation is controlled so as not to be performed even though an exposed operation key is pressed; a half-operation mode in which an operation is performed upon receiving an external key input, and the mode is switched back to the depression preventing mode if there is no key input within a prescribed time; and a full-operation mode in which an operation is performed without any restriction.

In accordance with another embodiment, the present invention, provides a method for preventing undesired external key depression including the steps of: determining whether a depression preventing mode has been set if a key is inputted; performing an operation corresponding to a pertinent key if the depression preventing mode has not been set, or determining whether a key input is a double click if the depression preventing mode has been set; and switching the mode to a half-operation mode if the key input is a double click, and performing an operation corresponding to a pertinent key if a key is inputted.

Preferably, by displaying a specific indication on a display unit of the mobile device, a user can be notified whether the device is currently in the depression preventing mode or in a state that the depression preventing mode has been released. The specific indication includes colors, icons having specific figures, pictures, letter, numerals, symbols or the like.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
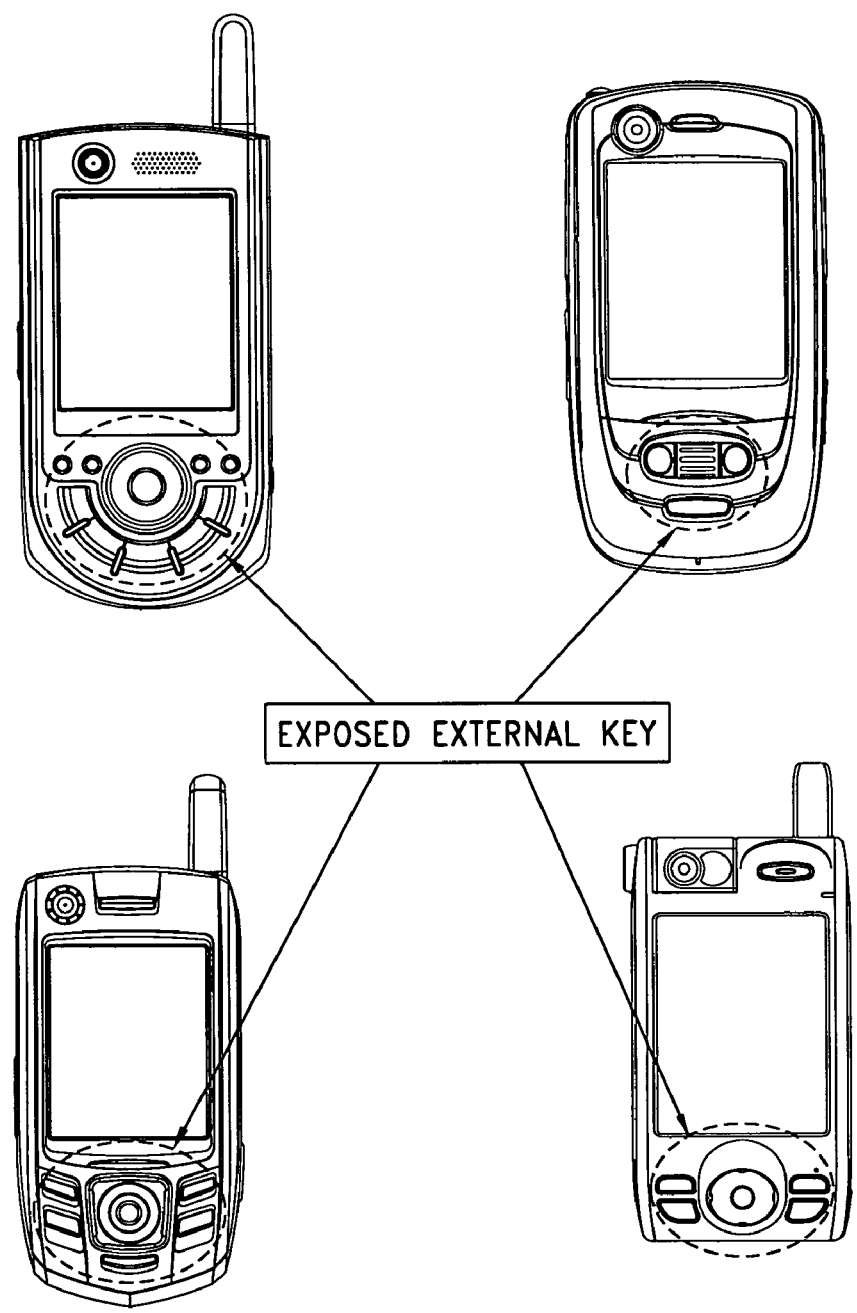
FIG. 1 is a view showing exposed external keys in mobile devices which are generally used.
Figure 2:
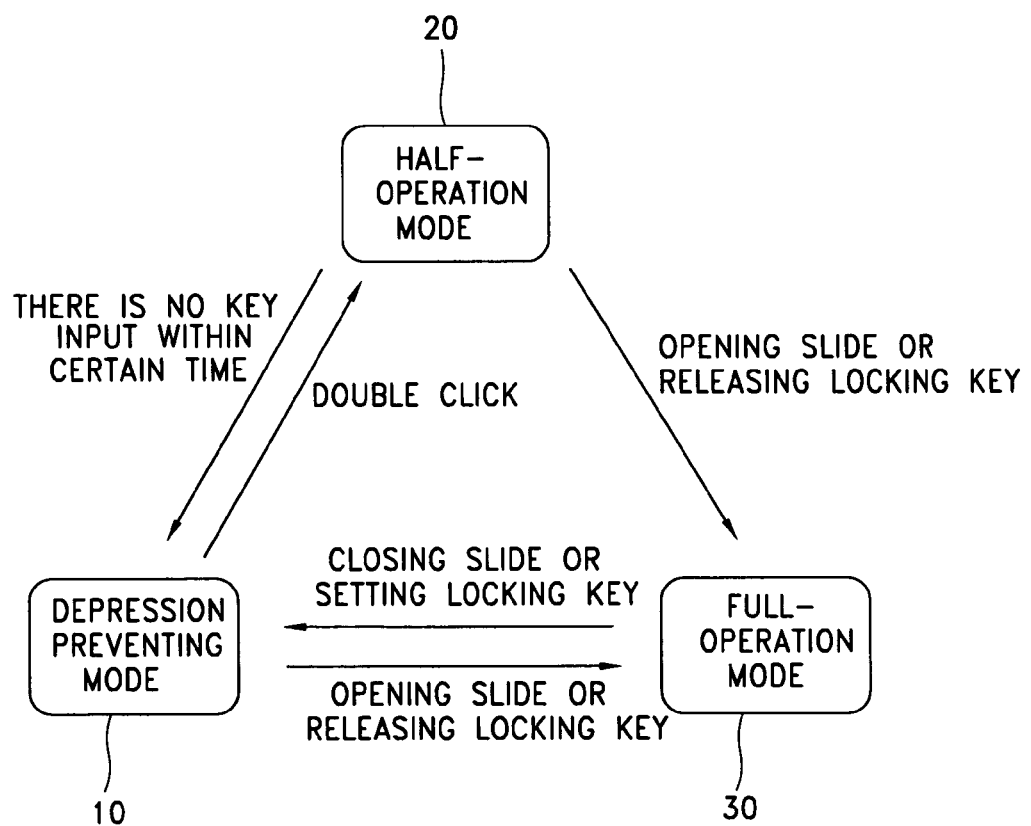
FIG. 2 is a view showing a method for preventing undesired key depression in accordance with one embodiment of the present invention.

FIG. 2 is a diagram showing a method for preventing undesired key depression in a mobile device in accordance with one embodiment of the present invention. The method is implemented by switching between or among a plurality of operating modes, including a depression preventing mode 10, a half-operation mode 20, and a full-operation mode 30. In the depression preventing mode 10, an operation key exposed outside the mobile device is controlled so as not to be operated even though it is pressed. In the half-operation mode 20, an operation is performed when an external key is pressed, and the mode is switched to the depression preventing mode if there is no key input within a prescribed time. In the full-operation mode 30, an operation is directly performed without any restriction when an external key is pressed. Each mode of operation will now be described in greater detail.

The depression preventing mode may be implemented in various ways depending on the type of mobile device. For example, for a slide-type mobile phone the depression preventing mode may refer to a state where the slide of the phone is closed. For a PDA or other mobile device, the depression preventing mode may refer to a normal carrying state.

In the depression preventing mode, simply pressing a key will not cause an operation to be performed. Rather, the operation will be performed only when a key input is received after a specific key is pressed in a predetermined pattern, e.g., after the key is double-clicked. The specific key may be a specially dedicated function key or may be the same key corresponding to the operation the user wishes to perform. If the specific key is a specially dedicated function key, then receiving a key input (e.g., from another key) after the function key is double-clicked will automatically cause the corresponding operation to be performed. If the specific key is the same key, then a corresponding operation may be performed on the second click, or the key may have to be pressed for a third time after being double click in order for the corresponding operation to be performed.

When the specific key is double-clicked, the depression preventing mode is switched to the half-operation mode. Then, when an external key is pressed in the half-operation mode, a corresponding operation is directly performed. While the double-clicking pattern is preferable for effecting this mode conversion, other key patterns may be used to switch the operating mode if desired. For example, the mode conversion may be performed when a specific key is pressed a predetermined number of times greater than two, or when a specific combination of keys are pressed.

After mode conversion has taken place, the half-operation mode will automatically switch back to the depression preventing mode 10 if a key input is not received within a prescribed time. Thus, in at least one-embodiment the depression preventing mode operates as the default mode when the mobile device has its slide closed, when a locking key is set, or when the mobile device is carried or otherwise operating in a monitoring or passive state.

Full-operation mode refers to a case where, for example, a slide of a slide-type mobile phone is opened, or where a locking key for a PDA or another mobile device has been released. In full-operation mode, depression of an external key is directly connected to performance of an operation.

A user can be notified of a current mode state through a display unit of a mobile device, such as an LCD. As one example, shown in FIG. 3, a depression preventing mode is displayed as 'X' at a predetermined location of a screen, and a state where the depression preventing mode has been released is displayed as 'O'. Through this technique, a user is easily notified of a current state of the device. While this technique is preferable, those skilled in the art can appreciate that another method of notifying a user of the operational state of the device may be used.

Figure 3:
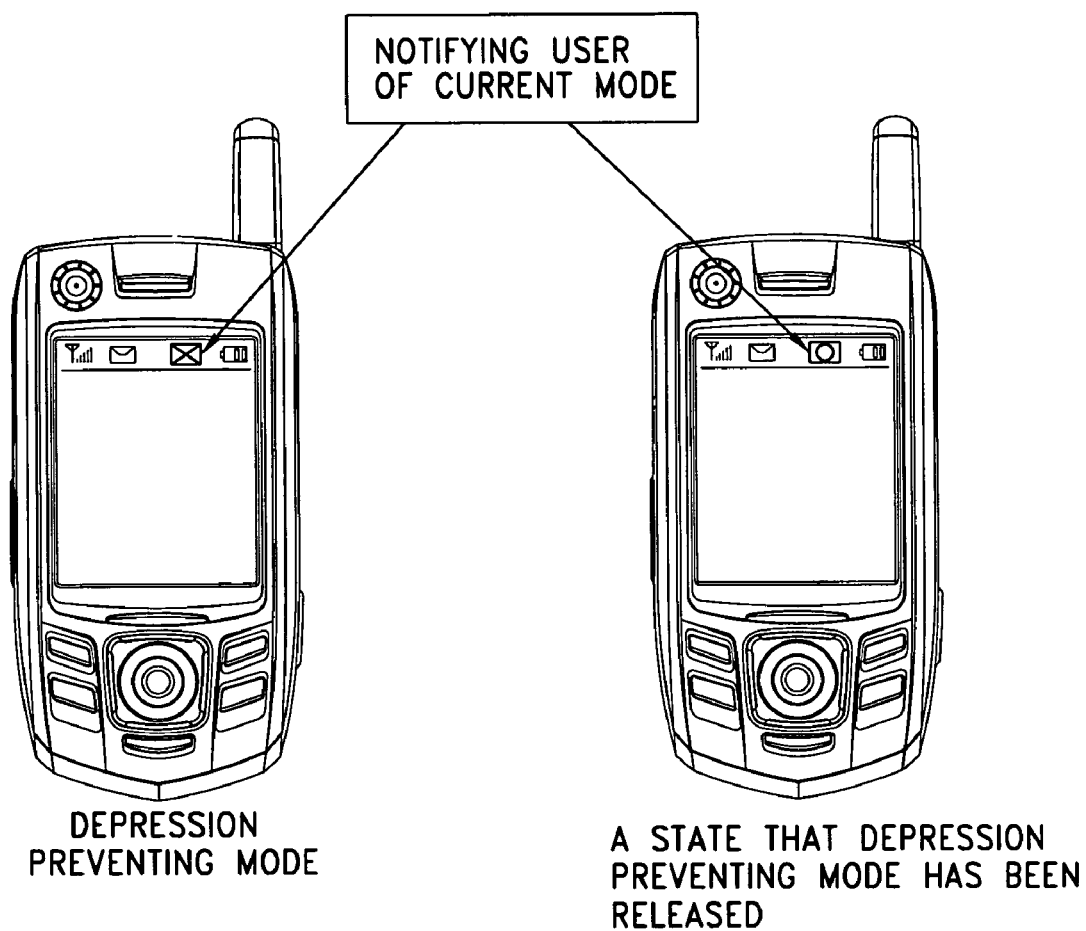
FIG. 3 is a view showing one embodiment of a mode-state displaying method implemented in a device according to the present invention.

For example, the mode state does not have to be displayed at the same position and in the same shape as shown in FIG. 3. Additionally, or alternatively, the mode state may be indicated by display of a specific color or color pattern, e.g., a state where the mobile device is operating in the depression preventing mode may correspond to the display of red text and/or graphics and a state where the depression preventing mode has been released may correspond to the display of blue text and/or graphics. As a further alternative, the mode state may be displayed as an icon of a specific shape, a picture (such as a figure made by drawing a slant line on a letter), a letter, a numeral, or other graphical and/or text-based information recognizable on a display.

If desired, the present invention may includes a variety of methods for notifying a user of whether the device is currently operating in a depression preventing mode or in a state that the depression preventing mode has been released, by displaying a specific indication on a display unit of the device.

A key pressing preventing method in accordance with the present invention includes determining whether a depression preventing mode has been set when a key is input for performing an operation corresponding to a pertinent key when the depression preventing mode has not been set or determining whether the key input is a double click when the depression preventing mode has been set and switching the mode to a half-operation mode when the key input is a double click and performing an operation corresponding to the pertinent key when a key is inputted within a prescribed time.

Figure 4:
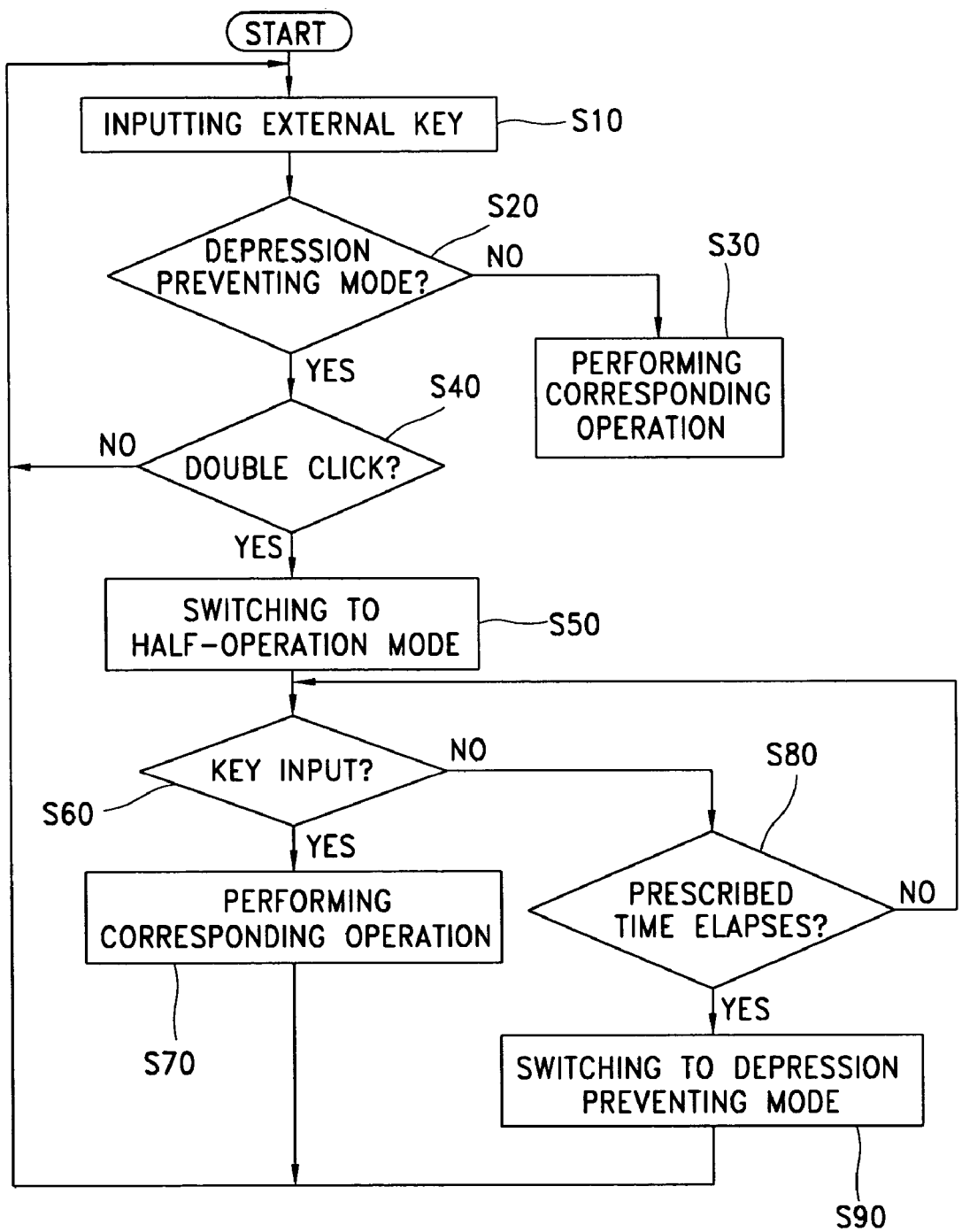
FIG. 4 is a flow chart showing steps included in an implementing process of a method for preventing undesired key depression in accordance with an embodiment of the present invention.

FIG. 4 is a flow chart showing steps included in a key pressing preventing method in accordance with the present invention. When an external key is pressed on purpose or by mistake (S10), a check is performed (e.g., by a mobile device processor) to determine whether the device is currently operating in a depression preventing mode (S20). The results of the check determine whether a corresponding operation is to be performed, i.e., an operation is performed depending on a current mode state of the device. An operation corresponding to a key input is directly performed if the device is not currently in the depression preventing mode (S30).

If the device is currently in the depression preventing mode, this mode may be switched to half-operation mode based on whether a specific key pattern has been input, e.g., whether a specific key has been double-clicked (S40). As previously discussed, this specific key may be a special function key or a key corresponding to an operation to be performed. If the key has been double clicked, the depression preventing mode is switched to the half-operation mode (S50). Then, it is determined whether another key input is received (S60). The half-operation mode is automatically switched back to the depression preventing mode if another key input is not received within a prescribed time.

If another key input is received before the prescribed time elapses, a corresponding operation is performed (S70). If another key is not input received, it is determined whether the prescribed time has been elapsed (S80). If the prescribed time has elapsed, the device is switched back to the depression preventing mode (S90).

The method for preventing undesired key depression in accordance with the present invention can therefore remarkably reduce probability of unintentionally pressing an external key, by using a double click instead of a method of pressing key for a prescribed time.

Further, the method for preventing undesired key depression in accordance with the present invention can provide a user with convenience, since in a half-operation mode external keys are easily pressed to perform operations and the mode is automatically switched to a depression preventing mode when a preset time elapses so that a user easily carries the mobile device. The present invention can also be implemented by only changing software of an existing method without requiring any hardware changes or modifications. Thus, the invention can be easily applied and implemented.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for preventing undesired key depression of a mobile device that has at least three modes, the method comprising:

providing a depression preventing mode, the depression preventing mode being a mode in which an operation of the mobile device is not performed even though a corresponding first key of the mobile device is pressed, wherein the mobile device is in the depression preventing mode when the mobile device is a sliding mobile phone in a closed state;

providing a half-operation mode, the half-operation mode being a mode in which the operation is automatically performed upon receiving an input from the first key, and the mobile device switches from the half-operation mode to the depression preventing mode when no input is received from the first key or another key within a prescribed time;

providing a full-operation mode upon opening of a slide of the sliding mobile phone to an opened position, the full-operation mode being a mode in which the operation is directly performed according to an input from the first key;

switching from the full-operation mode to the depression preventing mode in direct response to the slide moving from the opened position to a closed position; and switching from the depression preventing mode to the half-operation mode when a second key is double-clicked, wherein the first key and the second key are a same key, and wherein each of the depression preventing mode, the half-operation mode and the full-operation mode are separate modes.

2. The method of claim 1, further comprising:

displaying a specific indication on a display unit to notify a user of whether the mobile device is currently in the depression preventing mode or is currently in a state where the depression preventing mode has been released.

3. The method of claim 2, wherein the indication is an icon having a predetermined color, shape, picture, letter, numeral, or symbol.

4. The method of claim 2, wherein the indication is displayed as an 'X' when the mobile device is in the depression preventing mode, and the indication is displayed as an 'O' when the mobile device is in the state that the depression preventing mode has been released.

5. A method for preventing undesired key depression in a mobile device that has at least three modes of operation, the method comprising:

determining whether a depression preventing mode has been set when input from a first key occurs;

determining whether the first key input is a double click when the depression preventing mode has been set;

switching the mobile device from the depression preventing mode to a half-operation mode when the first key input is determined to be the double click, the mobile device remaining in the half-operation mode when input from a second key occurs within a prescribed time after the first key input, and the mobile device switching from the half-operation mode to the depression preventing mode when the second key input does not occur within the prescribed time after the first key input;

providing a full-operation mode from the depression preventing mode upon opening of a slide of the mobile device to an opened position, the full-operation mode being a mode in which an operation is directly performed according to an input from a key;

providing the full-operation mode from the half-operation mode upon opening of the slide to the opened position; and directly switching from the full-operation mode to the depression preventing mode in direct response to the slide moving from the opened position to a closed position, wherein each of the depression preventing mode, the half-operation mode and the full-operation mode are separate modes of the mobile device.

6. The method of claim 5, wherein the first key and a second key are the same key.

7. The method of claim 5, further comprising:

directly performing the operation corresponding to the first key input when the depression preventing mode has not been set.

8. The method of claim 5, further comprising:

maintaining the depression preventing mode when the first key input is determined to not be a double click.

9. The method of claim 5, further comprising:

notifying a user whether the mobile device is currently in the depression preventing mode or is currently in a state where the depression preventing mode has been released, by displaying a predetermined indication on a display unit.

10. The method of claim 9, wherein the indication is an icon having a predetermined color, shape, picture, letter, numeral, or symbol.

11. The method of claim 9, wherein the indication is displayed as 'X' when the mobile device is in the depression preventing mode, and the indication is displayed as 'O' when the mobile device is in the state that the depression preventing mode has been released.

12. The method of claim 5, wherein the half-operation mode is a mode in which an operation is performed upon receiving an input from a key.

13. A method for preventing undesired key depression in a mobile device that has at least three modes, the method comprising:

receiving an input from a first key of the mobile device;

determining whether the mobile device is in a depression preventing mode;

determining whether the first key was double-clicked when the mobile device is determined to be in the depression preventing mode;

switching the mobile device from the depression preventing mode to a half-operation mode when the first key is double-clicked;

determining whether a second key of the mobile device is pressed within a prescribed time when the mobile device switches to the half-operation mode, wherein a corresponding operation is immediately performed in the half-operation m ode when the second key is pressed before the prescribed rime elapses;

switching the mobile device from the half-operation mode to the depression preventing mode when the second key is not pressed within the prescribed time;

providing a full-operation mode from the half-operation mode upon opening of a slide of the mobile device to an open position, the full-operation mode being a mode in which an operation is directly performed according to an input from a key;

providing the full-operation mode from the depression preventing mode upon the opening of the slide to the open position; and directly switching from the full-operation mode to the depression preventing mode in response to the slide moving from the open position to a closed position, and wherein each of the depression preventing mode, the half-operation mode and the full-operation mode are separate modes of the mobile device.

14. The method of claim 13, wherein the first key and second key are a same key.

15. The method of claim 13, further comprising:

directly performing an operation corresponding to the first key input when the mobile device is determined to not be in the depression preventing mode.

16. The method of claim 13, further comprising:
maintaining the depression preventing mode when the first key is not double clicked.

17. The method of claim 13, further comprising:
notifying a user whether the mobile device is currently in the depression preventing mode or is currently in a state where the depression preventing mode has been released, by displaying a predetermined indication on a display unit.

18. The method of claim 17, wherein the indication is an icon having a predetermined color, shape, picture, letter, numeral, or symbol.

19. The method of claim 17, wherein the indication is displayed as 'X' when the mobile device is in the depression preventing mode, and the indication is displayed as 'O' when the mobile device is in the state that the depression preventing mode has been released.

20. A mobile device that has at least three modes of operation, the mobile device comprising:
a plurality of keys; and
a processor, wherein the processor switches the mobile device from a non-operation mode to a half-operation mode according to a key input of a specific pattern, the processor switches the mobile device from the half-operation mode to the non-operation mode when there is no key input within a prescribed time, the processor switches the mobile device to a full-operation mode from the non-operation mode upon opening of a slide of the mobile device and the processor switches the mobile device to the full-operation mode from the half-operation mode upon opening of the slide, and the processor switches the mobile device from the full-operation mode directly to the non-operation mode upon closing of the slide, wherein each of the non-operation mode, the half-operation mode and the full-operation mode are separate modes, and wherein when a second key input is received during the half-operation mode, the processor automatically executes a corresponding operation.

21. The mobile device of claim 20, wherein the specific pattern is that a first key is pressed at least twice.

22. The mobile device of claim 20, wherein the first key input and the second key input are generated by a same key.

23. A mobile device, comprising:
input means; and
control means for switching the mobile device from a non-operation mode to a half-operation mode according to a key input of a specific pattern, and for switching the mobile device from the half-operation mode to the non-operation mode when there is no key input within a prescribed time, the half-operation mode being a mode in which the control means automatically executes an operation when a key input is received, the control means further for switching the mobile device to a full-operation mode from the non-operation mode upon opening of a slide of the mobile device and for switching the mobile device from the half-operation mode to the full-operation mode upon opening of the slide, the full-operation mode being a mode in which an operation is directly performed according to an input from the input means, and the control means for directly switching the mobile device from the full-operation mode to the non-operation mode upon closing of the slide.

24. The mobile device of claim 23, wherein the specific pattern is that a first key is pressed at least twice.

25. A method of operating a mobile terminal having a body, an input device and a display unit, the method comprising:
providing a locking mode to the input device when the mobile terminal is in at least one of a closed position and an inactive mode;
maintaining the locking mode to the input device when an input signal received from the input device does not include a specific actuation pattern of the input device;
providing an unlocking mode to the input device upon receiving the specific actuation pattern of the input device;
resuming the locking mode for the input device depending upon detecting receiving no input signal from the input device within a specific time limit during the half-operation mode;
operating the mobile terminal in a half-operation mode to allow at least a portion of the input device to be accessible by a user when the unlocking mode is provided;
operating the mobile terminal in a full-operation mode to allow the user to access an entire portion of the input device depending upon detecting a slide of the mobile terminal in an open position; and
switching the mobile terminal from the full-operation mode directly to the locking mode upon detecting the slide of the mobile terminal being switched from the open position to a closed position.

26. The method of claim 25, further comprising:
displaying an unlocking mode indicator on at least one of the display unit and an external surface part of a body surrounding the display unit depending upon detecting at least one of the unlocking mode and the slide of the mobile terminal in the open position.

27. The method of claim 26, wherein a certain external portion of the input device is arranged at the external surface part of the body surrounding the display unit and the indicator comprises a display of at least one of a certain color, a color pattern, a certain shape, and a picture.

28. The method of claim 25, further comprising:
resuming the locking mode for the input device when the slide of the mobile terminal is in the closed position.

29. The method of claim 25, wherein the specific actuation pattern of the input device comprises at least one of:
a simultaneous actuation of at least one set of the input device within a specific time limit; and
a first actuation of at least one key of the input device and a second actuation of the at least one key sequentially following the first actuation within a first specific time limit.

30. The method of claim 29, wherein the at least one key is designated to perform locking and unlocking of the input device.

31. The method of claim 29, wherein the at least one key comprises a function key associated with a specific function in the mobile terminal and the specific function is performed upon detecting the first and second sequential actuations of the function key within the second specific time limit.

32. The method of claim 25, wherein the mobile terminal comprises a mobile communications terminal.

33. The method of claim 32, wherein the mobile terminal is configured to operate between the open position and the closed position and the mobile communications terminal comprises a sliding mobile communications terminal.

34. The method of claim 25, wherein the half-operation mode is a mode in which an operation is performed upon receiving an input from a key.

35. A mobile terminal having a plurality of operation modes, the mobile terminal comprising:

a body having at least one display unit;

an input unit comprising at least one input element being exposed on an external surface of the body, the input unit configured to be locked upon detecting the mobile terminal in at least one of a closed mode and an inactive mode; and a controller cooperating with the input unit to unlock at least a certain portion of the input unit to allow a user to operate the mobile terminal in a half-operation mode depending upon detecting a specific actuation pattern of the input unit within a specific time limit, wherein the locking mode is resumed for the input unit depending upon receiving no input signal from the input unit within the specific time limit during the half-operation mode, wherein the controller further cooperating with the input unit to operate the mobile terminal in a full-operation mode to allow the user to access an entirety of the input unit when the mobile terminal is in an open mode, and the controller to directly switch the mobile terminal from the full-operation mode to being locked when the mobile terminal is changed from the open mode to the closed mode based on moving the slide to a closed position.

36. The mobile terminal of claim 35, wherein the specific actuation pattern of the input unit comprises at least one of:

a simultaneous actuation of at least one set of the input unit within the specific time limit; and at least two sequential actuation of the at least one input element within the specific time limit, wherein the at least one input element comprises at least one of:

a key designated to perform locking and unlocking of the input unit, and a function key associated with a specific function in the mobile terminal in such a way that the user is allowed to perform the specific function in at least one of the half-operation mode and the full-operation mode.

37. The mobile terminal of claim 35, further comprising:

an unlocking mode indicator configured to be displayed on at least one of the display unit and a certain portion of the body surrounding the display unit upon detecting at least one of the half-operation mode and the full-operation mode, wherein the indicator comprises a display of at least one of a certain color, color pattern, a certain shape, and a picture.

38. The mobile terminal of claim 35, wherein the mobile terminal comprises a mobile communications terminal.

39. The mobile terminal of claim 38, wherein the input unit is configured to be locked when the mobile terminal comprises a sliding mobile terminal and a slide of the mobile terminal is in the closed position.

40. The mobile terminal of claim 39, wherein the closed mode is activated depending upon detecting the sliding mobile terminal in the closed position.

41. The mobile device of claim 35, wherein the half-operation mode is a mode in which an operation is performed upon receiving an input from a key.

* * * * *